United States Patent [19]
Horvay et al.

[11] 4,439,998
[45] Apr. 3, 1984

[54] APPARATUS AND METHOD OF CONTROLLING AIR TEMPERATURE OF A TWO-EVAPORATOR REFRIGERATION SYSTEM

[75] Inventors: Julius B. Horvay; Luis E. Prada, both of Louisville, Ky.

[73] Assignee: General Electric Company, Louisville, Ky.

[21] Appl. No.: 369,316

[22] Filed: Apr. 16, 1982

Related U.S. Application Data

[63] Continuation-in-part of Ser. No. 183,863, Sep. 4, 1980, abandoned.

[51] Int. Cl.³ .............................................. F25B 41/00
[52] U.S. Cl. ...................................... 62/199; 62/200; 62/231
[58] Field of Search ................. 62/199, 231, 157, 158, 62/525, 197, 200

[56] References Cited

U.S. PATENT DOCUMENTS

| | | | |
|---|---|---|---|
| 1,523,112 | 1/1925 | Fitzgerald | 62/199 |
| 2,128,020 | 8/1938 | Smilack | 62/127 |
| 2,133,949 | 10/1938 | Buchanan | 62/4 |
| 2,133,957 | 10/1938 | Harshberger | 62/116 |
| 2,133,962 | 10/1938 | Shoemaker | 62/115 |
| 2,182,318 | 12/1939 | Newill | 62/4 |
| 2,462,240 | 2/1949 | Van Vliet et al. | 62/4 |
| 2,576,663 | 11/1951 | Atchison | 62/4 |
| 2,884,765 | 5/1959 | Kroyer | 62/231 |
| 3,001,378 | 9/1961 | Stutrud | 62/157 |

Primary Examiner—Henry C. Yuen
Assistant Examiner—Harry Tanner
Attorney, Agent, or Firm—Frank P. Giacalone; Radford M. Reams

[57] ABSTRACT

The present refrigeration apparatus includes a single condenser and compressor, two evaporators, and more particularly an electronically controlled valve system that delivers refrigerant to one evaporator in preference to the other, but will cause the valve system to deliver refrigerant to the other evaporator after a predetermined amount of time.

6 Claims, 3 Drawing Figures

APPARATUS AND METHOD OF CONTROLLING AIR TEMPERATURE OF A TWO-EVAPORATOR REFRIGERATION SYSTEM

CROSS REFERENCE TO RELATED APPLICATION

This application is a continuation-in-part of application Ser. No. 183,863, filed Sept. 4, 1980, now abandoned, the disclosure of which is hereby incorporated by reference.

BACKGROUND OF THE INVENTION

This invention relates to a control for a refrigerator incorporating two evaporators, one of which is maintained at a below freezing temperature for cooling the freezer compartment and the other of which is maintained at a higher above freezing temperature for cooling the fresh food compartment and more particularly, to an electronically controlled valving system that delivers refrigerant to the fresh food evaporator in preference to the freezer evaporator and directs flow of refrigerant to the freezer evaporator after a predetermined amount of time independent of the fresh food compartment temperatures.

Refrigeration systems incorporating a single condenser that delivers refrigerant selectively to one or the other of two evaporators are well known. In U.S. Pat. No. 1,523,112, the thermostat in either compartment causes refrigerant flow to its respective evaporator, however, in the case when both thermostats call for cooling refrigerant will be diverted to the colder below freezing compartment. In U.S. Pat. No. 2,133,957, when the demand for cooling is from both of the compartments, the low temperature evaporator is given preference. At such times, the higher temperature compartment is not being refrigerated and may rise in temperature to an abnormally high value. In this event, means are provided for transferring refrigeration to the high temperature evaporator. It should be noted that this rise in temperature may be over a long or extended period of time in which event food in the higher temperature compartment may be subjected to these relatively high temperatures for a substantial period of time that may be sufficient to cause food spoilage. In U.S. Pat. No. 2,576,663, the fresh food compartment evaporator has preference when both compartments require cooling and the freezer evaporator is activated only after the fresh food evaporator and fresh food compartment temperature is satisfied. A fan that runs during operation of either evaporator effectively removes any accumulated frost from the fresh food evaporator when the freezer evaporator is activated by circulating the above freezing fresh food compartment air over the fresh food evaporator.

SUMMARY OF THE INVENTION

It is therefore an object of the present invention to provide an improved automatic control of a two evaporator refrigeration system.

It is another object of the invention to deliver refrigerant to the fresh food compartment evaporator in preference to the freezer compartment evaporator.

It is still another object of the invenion to divert refrigerant from the fresh food evaporator to the freezer evaporator after a predetermined period of time independent of the fresh food compartment temperature.

These and other objects of the invention are achieved in a refrigerating apparatus and method of controlling air temperature of a two evaporator refrigerator system including a cabinet containing an above freezing compartment and a below freezing compartment. The refrigerator system includes a single compressor and condenser and a fresh food evaporator arranged in the above freezing compartment and a freezer evaporator arranged in the below freezing compartment. Valve means in the system are operable for delivering refrigerant to either one of the evaporators. A temperature sensing member is arranged in each compartment. The refrigerant in the system is controlled electronically to cause the valve means to deliver refrigerant to the fresh food evaporator when it or both temperature sensing members sense a temperature above a predetermined value in preference to the freezer evaporator.

The electronic control provides decision means that cause the valve means to terminate refrigerant flow to the fresh food evaporator after a predetermined amount of time independent of the temperature sensed in the fresh food compartment and to deliver refrigerant to the freezer evaporator.

*For the purpose of this invention the words microcomputer and microprocessor have been used as synonyms.

Figure 2:
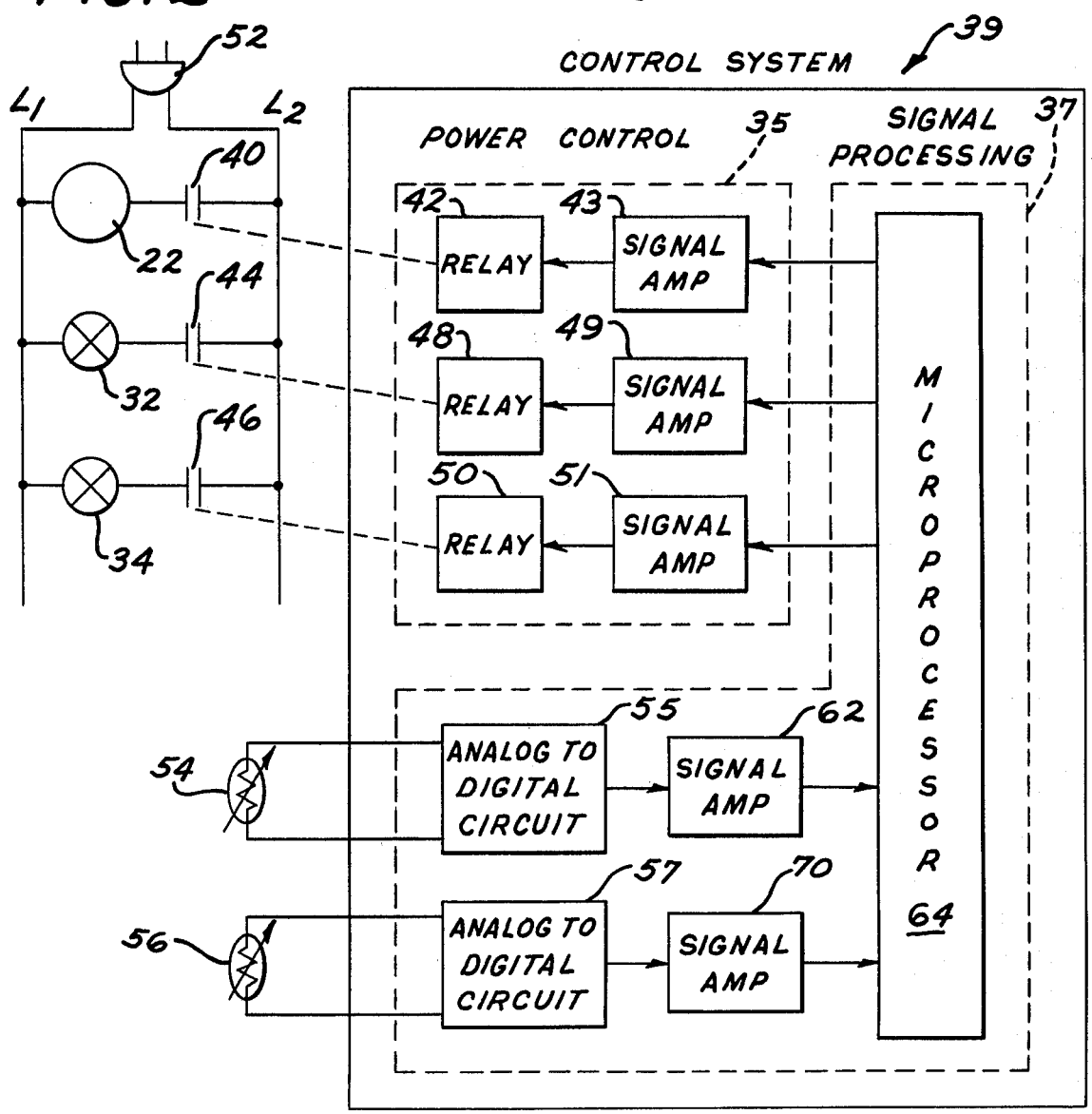
FIG. 2 is a functional block diagram and partial circuit of a control system constructed in accordance with the invention and employing a microcomputer* as the decision means of the invention.
Figure 3:
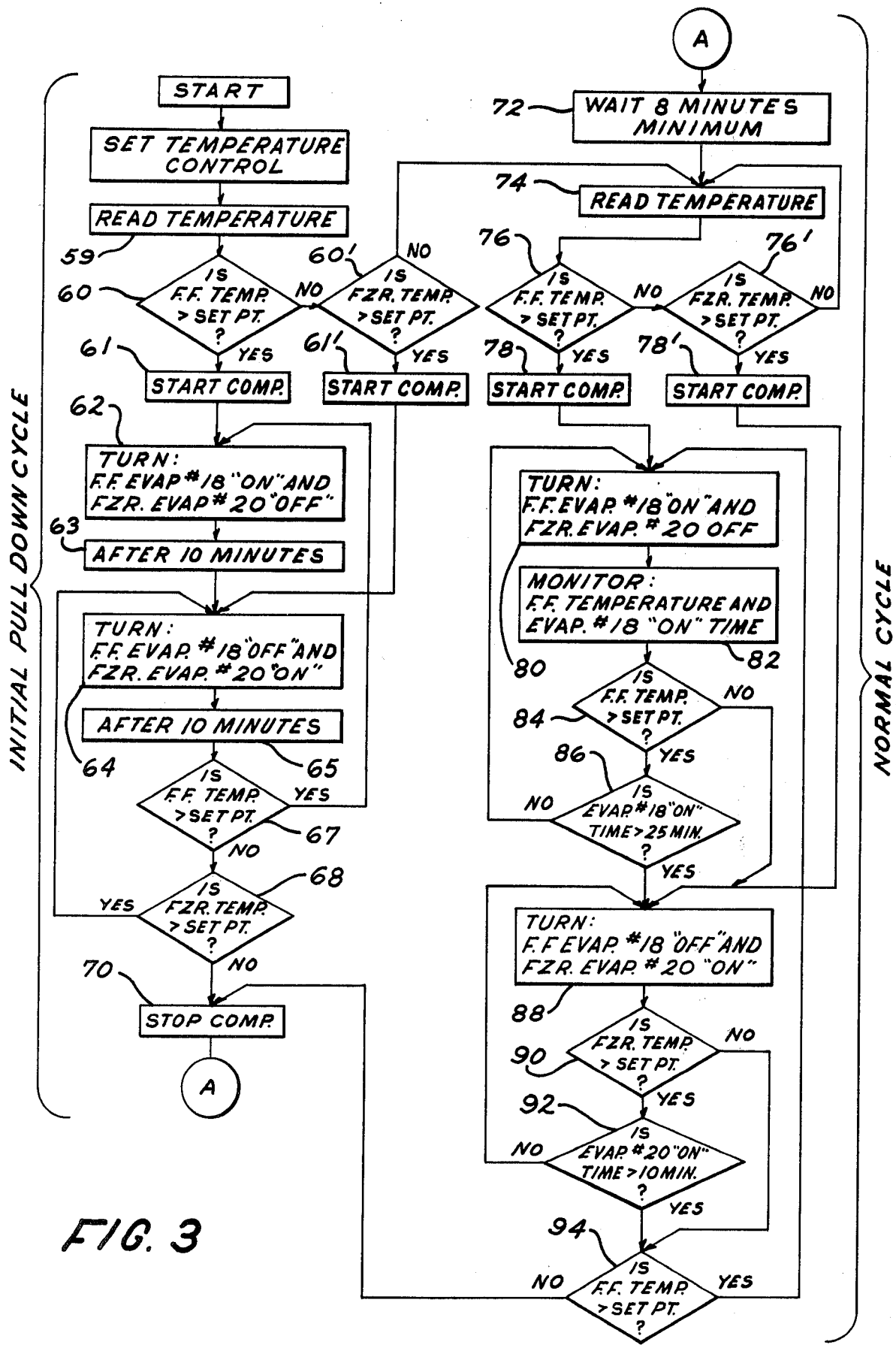

FIG. 3 is a program flow diagram which may be employed in developing a program for the microcomputer of FIG. 2.

DETAILED DESCRIPTION

Figure 1:
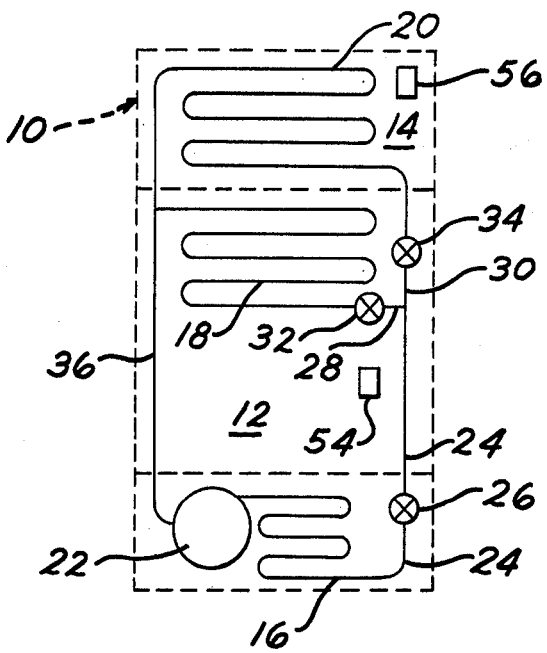
FIG. 1 is a diagramatic view of a refrigerating system incorporating the present invention.

Referring now to FIG. 1, there is shown diagramatically a refrigerator cabinet 10 including an above freezing fresh food compartment 12 and a below freezing frozen food compartment 14. The refrigerating system includes a condenser 16, two evaporators 18 and 20 and a compressor 22 connected in a closed circuit. The evaporators 18 and 20 are arranged to be supplied in parallel, evaporator 20 located in the freezer compartment is designed to operate at relatively low temperatures, for example between $-50°$ F.$-10°$ F., while evaporator 18 located in the fresh food compartment is designed to operate at higher temperatures, for example over a range from $15°$ F. to $35°$ F. Refrigerant is supplied to the evaporators 18 and 20 from a common liquid line 24 in which is arranged the system expansion device 26 through branch conduits 28 and 30 respectively. As shown in the present embodiment, arranged in each branch conduit 28 and 30 is a flow control valve 32 and 34 respectively. The outlets of evaporators 18 and 20 being connected to a common suction conduit 36. While in the present embodiment, a valve is provided in each branch conduit 28 and 30, it should be noted that one diverter type valve may be arranged at the junction of the liquid line 24 and branch conduits 28 and 30 to deliver refrigerant selectively to either evaporator 18 and 20 in a manner to be explained fully hereinafter. In the present embodiment of the invention, refrigerator fresh food compartment 12 including evaporator 18 is of the cycle defrost type which will automatically defrost under influence of the warmer fresh food compartment air when the evaporator 18 is inactive in the system or when refrigerant is directed to the freezer evaporator 20. In this type of refrigerator, defrosting of the low temperature evaporator 20 may require that suitable heating means (not shown) be provided in the freezer compartment. It should further be noted in refrigeration systems employing more than one evaporator that an expansion device may be provided for each evaporator. Accordingly, an expansion device can, if desired, be employed for each evaporator 18 and 20 and can be conveniently arranged in each branch circuit 28 and 30 respectively. A separate expansion device for each evaporator may be used whether a single valve is used as suggested or two valves as shown in the present embodiment is employed.

Referring now to FIG. 2, a simplified schematic diagram of the present control circuit including the electronic control system 39 is shown for a single condenser two evaporator refrigerator. The control system 39 includes a power control portion 35 which includes the power output function and a signal processing portion 37 which includes the control input function and microcomputer 64. The compressor unit 22 has one terminal connection to power supply $L_2$ via a switch 40 of a control relay 42 in the power control portion 35 of control 39. The relay 42 is activated by an output signal from microcomputer 64 through a signal amplifier 43 located in the power control portion 35. A second terminal of compressor unit 22 is connected directly to power supply line $L_1$. The valve 32 has one terminal connected to power supply $L_2$ via a switch 44 of a control relay 48 in power control portion 35 of control 39. The relay 48 is activated by an output signal from micro-processor 64 through a signal amplifier 49. Valve 34 has one terminal connected to power supply line $L_2$ via a switch 46 of a control relay 50 in the power control portion 35 of control system 39. The relay 50 is activated by an output signal from a microprocessor 64 through a signal amplifier 51. A second terminal of each of the valves 32 and 34 is connected directly to power supply $L_1$. Power lines $L_1$ and $L_2$ are coupled to a power plug 52 which is adapted to be connected to a conventional 60 hertz, 120 volt household power source.

The input signals to the control system 39 are received from the electronic temperature sensor 54 arranged in the fresh food compartment 12 and electronic temperature sensor 56 arranged in the freezer compartment 14. Both of the sensors 54 and 56 are provided with means for adjusting them to a set temperature at which its respective compartment is to be maintained. The sensor 54 has its output coupled through a suitable analog-to-digital conversion circuit 55 and signal amplifier 62 to an input of microcomputer 64 to allow periodic sensing and storage of the interior temperature of the fresh food compartment 12. The sensor 56 has its output coupled through a suitable analog-to-digital conversion circuit 57 and signal amplifier 70 to another input of microcomputer 64 to allow periodic sensing and storage of the interior temperature of the freezer compartment 14.

Microcomputer 64 may comprise a self-contained integrated circuit such as a Mostek MK3870 including an arithmetic logic circuit, appropriate memory registers and input/output circuits as is well known in the art. Microcomputer 64, in part, is pre-programmed to be adapted to serve as a decision means for providing operation of the refrigerant system compressor 22 and operation of valves 32 and 34 in a manner that will cause valve 32 to terminate the flow of refrigerant to evaporator 18 after a predetermined period of time independent of the fresh food compartment sensor 54 and cause valve 34 to deliver refrigerant to freezer compartment evaporator 20. The provision of a maximum time in which fresh food evaporator 18 is active limits the amount of frost that can accumulate on its surfaces to an amount that can be effectively removed when operation of the system has switched to activate freezer evaporator 20. The circulation of relatively warm, above freezing fresh food compartment air passing over the evaporator 18 by natural or forced convection provides a cycle defrost during those periods of time when the low temperature freezer evaporator 20 is active in the system.

In the present system, in the event both sensor 54 and 56 sense temperatures above a predetermined value, the fresh food evaporator 18 is given preference over the freezer evaporator 20 and refrigerant will be delivered to the evaporator 18 through valve 32 with valve 34 remaining in its closed position.

By the present control, with valve 32 open, refrigerant will be delivered to evaporator 18 for a maximum predetermined period of time. After this period of time, even if the fresh food compartment is still above the set temperature and requires further cooling, valve 32 will close and valve 34 open so that refrigerant flow will be diverted from fresh food evaporator 18 to the freezer evaporator 20. This switching from evaporator 18 to evaporator 20 takes place provided sensor 56 at this time senses a freezer compartment temperature above the predetermined or set value. Refrigerant will then be delivered to freezer evaporator 20 until the freezer compartment is at set temperature and sensor 56 is satisfied, at which time valve 34 will close and valve 32 open so that refrigerant will be redirected to evaporator 18. This switching of refrigerant flow back to evaporator 18 takes place provided sensor 54 senses a fresh food compartment temperature above a predetermined or set valve.

Referring now to FIG. 3, a program flow chart is shown which may be used by those skilled in the art to establish a set of program instructions for microcomputer 64. It will be appreciated that the illustrated flow chart may represent only a portion of a complete program for microcomputer 64 by which other functions of the refrigerator may also be controlled. The program flow chart includes an initial pull down portion which programs the operation of the system from the initial start and a normal cycling portion which programs the operation of the system during its routine or normal operation.

The initial cool down portion of the program is intended to bring both the fresh food and freezer compartment to near normal set temperatures without cooling the fresh food compartment to the exclusion of the freezer compartment. For example, in the event of initial start up or a condition wherein both the compartments, and more specifically the fresh food compartment, may be at ambient temperatures substantially higher than the set temperatures. Without a time override as provided by the present invention and with the fresh food compartment having preference, refrigerant would be delivered to evaporator 18 for an extended period of time which may be sufficient to cause a substantial amount of frost to form on the evaporator before the fresh food compartment reaches its set temperature. To prevent this situation, the initial cool down portion of the program includes a first maximum ten minute period wherein refrigerant is delivered to fresh food evaporator 18 after which the valves switch refrigerant flow from fresh food to freezer evaporator regardless of fresh food compartment temperatures and a second maximum ten minute period wherein refrigerant is delivered to freezer evaporator 20 after which the fresh food and freezer compartment temperatures are read and a decision made whether to switch refrigerant flow to evaporator 18 and cooling back to the fresh food compartment. The maximum run times insure that the freezer compartment evaporator is activated during the initial cool down period of refrigerator operation. While it is desirable that a maximum time be set in the program, it is not necessary that it be 10 minutes as shown in the illustrated embodiment, and accordingly, other maximum times based on criteria for a specific refrigerator may be established in carrying out the present invention.

In initiating operation of the refrigerator, at the initial start, the set temperature controls 56 and 54 in the fresh food and freezer compartments respectively are set at the temperature each compartment is to be maintained. Upon entering the set temperatures in the program by setting controls 54 and 56, inquiry 59 reads the temperature of the fresh food and frozen compartments. Next, inquiry 60 determines whether the fresh food compartment temperature is greater than set point. If the answer is no, indicating that additional cooling at this time is not required in the fresh food compartment, then the next inquiry 60' determines whether the freezer compartment temperature is greater than the set point. If the answer is no, the program moves into the normal cycle portion of the program and bypasses the remaining program of the initial pull down portion. In the event the answer to inquiry 60 is no but the answer to inquiry 60' is yes, then instruction 61' to close switch 40 starting the compressor and signal instruction 64 will close switch 46 opening the freezer evaporator valve 34 to divert refrigerant to evaporator 20, switch 44 remains open and the fresh food evaporator valve 32 closed. If the answer to inquiry 60 regarding the fresh food compartment is Yes, indicating that additional cooling is required, instruction 61 will close switch 40 starting the compressor and instruction 62 will close switch 44 opening the fresh food evaporator valve 32 to divert refrigerant to evaporator 18, switch 46 remains open and the freezer evaporator valve 34 closed. Following this, the program moves to instruction 63, the first time period which maintains the system in the present mode for 10 minutes, after which time instruction 64 opens switch 44 causing the fresh food evaporator valve 32 to close and closes switch 46 to cause freezer evaporator valve 34 to open thereby diverting refrigerant to evaporator 20. Following this, the program moves to instruction 65, the second time period which maintains the system in the present mode for 10 minutes. Next, inquiry 67 determines whether the fresh food compartment is greater than set point. If the answer is Yes indicating cooling is required, the instruction moves the program back to instruction 62 and the valve 32 opens diverting refrigerant to fresh food evaporator 18 and the freezer evaporator valve 34 closes deactivating evaporator 20. If the answer is No indicating that the fresh food compartment is at or below set temperature and does not require further cooling, the program moves to inquiry 68 to determine whether the freezer food compartment is greater than set point. If the answer is Yes indicating cooling is required, the instruction moves the program back to instruction 64 and fresh food evaporator valve 32 closes deactivating evaporator 18 and freezer evaporator valve 34 opens to activate evaporator 20. If the answer is No indicating that the freezer is at set temperature, the instruction 70 will open switch 40 to stop the compressor thereby completing the initial pull down portion of the program with both the fresh food and freezer compartments at set point.

From this point on with both compartments at their set temperatures, the program proceeds in the normal cycling portion of the program. At this point, the instruction 72 is to wait a minimum amount of time before a compressor restart is attempted which varies relative to the particular refrigerator design, in this instance, eight minutes was selected. Following the minimum wait period, the instruction 74 reads the temperatures in the fresh food and freezer compartment. Next, inquiry 76 determines whether the temperature of the fresh food compartment is greater than set point. If the answer is No, indicating that additional cooling at this time is not required in the fresh food compartment, then the next inquiry 76' determines whether the freezer compartment temperature is greater than set point. If the answer is no, the program moves back to instruction 74 and continues to inquire of the temperature in the fresh food and freezer compartments. In the event the answer to inquiry 76 is no but the answer to inquiry 76' is yes, then instruction 78' will close switch 40 starting the compressor and signal instruction 88 to close switch 46, opening the freezer evaporator valve 34 to divert refrigerant to evaporator 20, switch 44 remains open and the fresh food evaporator valve 32 closed. If the answer to inquiry 76 regarding the fresh food compartment is Yes, indicating that additional cooling is required, instruction 78 will close switch 40 to start the compressor and instruction 80 will close switch 44 opening the fresh food evaporator valve 32 to divert refrigerant to evaporator 18 with switch 46 remaining open and the freezer evaporator valve 34 closed. Following this, the instruction 82 monitors the fresh food compartment temperature and the period of time the fresh food evaporator 18 has been active in the system. The next inquiry 84 asks the question whether the fresh food compartment temperature is above the set point. If the answer is No, indicating that cooling is no longer required, then the program moves to instruction 88 and the fresh food evaporator valve 32 is turned off inactivating evaporator 18 and the freezer evaporator valve 34 is opened activating evaporator 20. If the answer is Yes, indicating further cooling is required, then inquiry 86 asks the question, is the period of time fresh food evaporator 18 been activated greater than 25 minutes. If the answer is No, the program moves back to instruction 80 and the fresh food evaporator valve 32 remains open and the freezer evaporator valve 34 remains closed. If the answer is Yes, indicating that the fresh food evaporator has been active for more than (25) twenty-five minutes, then instruction 88 opens switch 40 to close the fresh food evaporator valve 32 independent of fresh food compartment temperature, and closes switch 46 to open valve 34 and activate freezer evaporator 20. Next, inquiry 90 asks the question whether the freezer compartment temperature is greater than set point. If the answer is yes, then the next inquiry 92 asks the question whether the freezer evaporator 20 has been on for more than 10 minutes. If the answer to inquiry 90 is no, then inquiry 92 is bypassed and the next inquiry 94 asks the question whether the fresh food compartment temperature is greater than set point. If the answer to inquiry 92 is no, then the program moves to instruction 88 and the freezer evaporator valve 34 remains open. If the answer to inquiry 92 is yes, the program moves to inquiry 94. If the answer to inquiry 94 is yes, indicating that additional fresh food compartment cooling is required, then the program moves back to instruction 80 and switch 44 will close, opening the fresh food evaporator valve 32 to divert refrigerant to evaporator 18. If the answer to inquiry 94 is No, indicating the fresh food evaporator compartment temperature is not greater than set point, then the program moves to instruction 70 which opens switch 40 and the compressor is turned off since both compartments at their set temperatures. At this point, the program will move to the normal cycle wherein the instruction 72 is to wait a minimum amount of time before inquiry 74 reads the temperature and inquiries 76, 76' determine whether the temperatures of the fresh food and/or freezer compartments are greater than set point.

It will be appreciated that there has been described a simple and effective electronic control for an automatic refrigeration two compartment, two evaporator refrigerator system whereby energy usage may be minimized by better balancing the activation times of the two evaporators including a maximum time during which the preferred evaporator may be activated. In summary, as the sensor 56 calls for fresh food compartment refrigeration, valve 32 opens and valve 34 closes and the compressor is energized. Once the fresh food sensor 56 is satisfied or after a selected period of time, whichever occurs first, valve 34 opens activating evaporator 20 and valve 23 closes deactivating evaporator 18 which automatically starts the passive cycle defrost of evaporator 18. When the freezer compartment temperature is satisfied, compressor turns off, in the event the fresh food compartment requires cooling, the cycle will repeat.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. In a refrigerating apparatus including a cabinet containing an above freezing compartment and a below freezing compartment, a refrigeration system including a compressor, a condenser, a first evaporator arranged in said above freezing compartment, a second evaporator arranged in said below freezing compartment, valve means operable for delivering refrigerant to either one of said evaporators, temperature selecting means in each of said compartments for selecting a set temperature in said compartment, a first temperature responsive means in said above freezing compartment, a second temperature responsive means in said below freezing compartment, the combination including a normal operating cycle operable when the temperature of both of said compartments is within a set temperature and an initial pull down cycle operable when the temperature of said fresh food compartment is substantially above said set temperature comprising:

control means for causing said valve means to deliver refrigerant to said first evaporator in preference to said second evaporator when both of said temperature responsive means sense a temperature above a predetermined value;

decision means for causing said valve means to terminate the flow of refrigerant to said first evaporator when said above freezing compartment is at said predetermined temperature or after a predetermined amount of time independent of said first temperature responsive means and to cause said second valve means to deliver refrigerant to said second evaporator and for proceeding under said normal operating cycle when the temperature of both of said compartments is below said set temperature.

2. In a refrigerating apparatus including a cabinet containing an above freezing compartment and a below freezing compartment, a refrigeration system including a compressor, a condenser, a first evaporator arranged in said above freezing compartment, a second evaporator arranged in said below freezing compartment, valve means operable for delivering refrigerant to either one of said evaporators, temperature selecting means in each of said compartments for selecting a set temperature in said compartments, a first temperature responsive means in said above freezing compartment, a second temperature responsive means in said below freezing compartment, the combination including a normal operating cycle operable when the temperature of both of said compartments is within a set temperature and an initial pull down cycle operable when the temperature of said fresh food compartment is substantially above said set temperature comprising:

memory means for receiving and storing the fresh food and freezer compartment temperatures;

means comparing said fresh food and freezer food temperatures;

control means coupled to said comparing means for causing said valve means to deliver refrigerant to said first evaporator in preference to said second evaporator when both of said temperature responsive means sense a temperature above a predetermined value;

decision means for causing said valve means to terminate the flow of refrigerant to said first evaporator when said above freezing compartment is at said predetermined temperature or after a predetermined amount of time independent of said first temperature responsive means and to cause said second valve means to deliver refrigerant to said second evaporator and for proceeding under said normal operating cycle when the temperature of both of said compartments is below said set temperature.

3. An automatic control system for a refrigerating apparatus including a cabinet containing an above freezing compartment and a below freezing compartment, a refrigeration system including a compressor, a condenser, a fresh food evaporator arranged in said above freezing compartment, a freezer evaporator arranged in said below freezing compartment, valve means operable for delivering refrigerant to either one of said evaporators, a first temperature responsive means including means for selecting a predetermined set temperature for said above freezing compartment, a second temperature responsive means including means for selecting a predetermined set temperature for said below freezing compartment, the combination including an initial pull down cycle including means giving preference to said fresh food evaporator when the temperature of said fresh food compartment is substantially above said set temperature comprising:
- memory means for receiving and storing the fresh food and freezer compartment temperatures;
- means comparing said fresh food and freezer food temperatures;
- control means coupled to said comparing means for causing said valve means to deliver refrigerant to said fresh food evaporator in preference to said freezer evaporator when both of said temperature responsive means sense a temperature above said predetermined set value;
- means monitoring said fresh food compartment temperature and the accumulated time said fresh food evaporator has been active in said refrigeration system;
- decision means for causing sid valve means to divert refrigerant to said fresh food evaporator when the temperature is above said set temperature to terminate the flow of refrigerant to said fresh food evaporator after a first predetermined amount of time after a predetermined amount of accumulated time independent of said first selected set temperature and to cause said second valve means to deliver refrigerant to said freezer evaporator for a second predetermined amount of time and for proceeding under said normal operating cycle when the temperature of both of said compartments is below said set temperature.

4. An automatic control system for a refrigerating apparatus including a cabinet containing an above freezing compartment and a below freezing compartment, a refrigeration system including a compressor, a condenser, a fresh food evaporator arranged in said above freezing compartment, a freezer evaporator arranged in said below freezing compartment, valve means operable for delivering refrigerant to either one of said evaporators, a first temperature responsive means including means for selecting a predetermined set temperature for said above freezing compartment, a second temperature responsive means including means for selecting a predetermined set temperature for said below freezing compartment, the combination including a normal operating cycle wherein the temperature of said compartments is within a set temperature and an initial pull down cycle comprising:
- memory means for receiving and storing the fresh food and freezer compartment temperatures;
- means comparing said fresh food and freezer food temperatures;
- control means coupled to said comparing means for energizing said compressor and causing said valve means to deliver refrigerant to said fresh food evaporator in preference to said freezer evaporator when both of said temperature responsive means sense a temperature above said predetermined set value and for going to normal cycle if the temperature of both compartments is below said set point;
- first means measuring accumulated time said fresh food evaporator has been active in said refrigeration system;
- means coupled to said first means for causing said valve means to terminate refrigerant flow to said fresh food evaporator and directing refrigerant flow to said freezer evaporator;
- second means measuring accumulated time said freezer evaporator has been active in said refrigeration system;
- means coupled to said second means for causing said valve means to give preference to said fresh food evaporator when the temperature of both of said compartments is above said set point temperature to terminate refrigerant flow to said freezer evaporator and diverting refrigerant flow to said fresh food evaporation when said fresh food compartment temperature is above the set point temperature;
- means monitoring said fresh food compartment temperature and the accumulated time said fresh food evaporator has been active in said refrigeration system;
- decision means for causing said valve means to terminate the flow of refrigerant to said freezer evaporator when said freezer compartment is below predetermined set temperature or after a predetermined amount of accumulated time independent of said first selected set temperature and to cause said valve means to deliver refrigerant to said fresh food evaporator and for proceeding under said normal operating cycle when the temperature of both of said compartments is below said set temperature, and for terminating operation of said compressor if the temperature of the fresh food compartment is also below the set temperature.

5. The method of air temperature control for a refrigerating apparatus including a cabinet containing an above freezing compartment and a below freezing compartment, a refrigeration system including a compressor, a condenser, a first evaporator arranged in said above freezing compartment, a second evaporator arranged in said below freezing compartment, valve means operable for delivering refrigerant to either one of said evaporators, a first temperature responsive means in said above freezing compartment, a second temperature responsive means in said below freezing compartment, the method comprising:
- controlling operation of said valve means to deliver refrigerant to said first evaporator in preference to said second evaporator when both of said temperature responsive means sense a temperature above a predetermined value;
- operating said valve means under control of decision means to terminate the flow of refrigerant to said first evaporator when said above freezing compartment is at said predetermined temperature or after a predetermined amount of time independent of said first temperature responsive means and to cause said second valve means to deliver refrigerant to said second evaporator.

6. A method of air temperature control for a refrigerating apparatus including a cabinet containing an above freezing compartment and a below freezing compartment, a refrigeration system including a compressor, a condenser, a fresh food evaporator arranged in said above freezing compartment, a freezer evaporator arranged in said below freezing compartment, valve means operable for delivering refrigerant to either one of said evaporators, a first temperature responsive means including means for selecting a predetermined set temperature for said above freezing compartment, a second temperature responsive means including means for selecting a predetermined set temperature for said below freezing compartment, the method comprising:

receiving and storing the fresh food and freezer compartment temperatures;

comparing said fresh food and freezer food temperatures; controlling operation of said valve means to deliver refrigerant to said fresh food evaporator in preference to said freezer evaporator when both of said temperature responsive means sense a temperature above said predetermined set value;

measuring accumulated time said fresh food evaporator has been active in said refrigeration system against a set predetermined time;

controlling operation of said valve means to terminate refrigerant flow to said fresh food evaporator and directing refrigerant flow to said freezer evaporator when the accumulated time said fresh food evaporator is at or greater than set predetermined time;

measuring accumulated time said freezer evaporator has been active in said refrigeration system against set predetermined time;

controlling operation of said valve means to terminate refrigerant flow to said freezer evaporator and diverting refrigerant flow to said fresh food evaporation when the accumulated time said freezer evaporator is at or greater than set predetermined time;

monitoring said fresh food compartment temperature and the accumulated time said fresh food evaporator has been active in said refrigeration system against a set predetermined time;

operating said valve means under control of decision means to terminate the flow of refrigerant to said fresh food evaporator when said above fresh food compartment is at said predetermined set temperature or after a predetermined amount of accumulated time independent of said first selected set temperature and to cause said second valve means to deliver refrigerant to said freezer evaporator.

* * * * *